(12) United States Patent
Keiser

(10) Patent No.: US 8,100,149 B2
(45) Date of Patent: Jan. 24, 2012

(54) COMBINED PRESSURE, TEMPERATURE AND AIR VENT DEVICE

(75) Inventor: David B Keiser, Westminster, CA (US)

(73) Assignee: Griswold Controls Inc, Irvine, CA (US)

( * ) Notice: Subject to any disclaimer, the term of this patent is extended or adjusted under 35 U.S.C. 154(b) by 684 days.

(21) Appl. No.: 12/236,429

(22) Filed: Sep. 23, 2008

(65) Prior Publication Data

US 2009/0078327 A1    Mar. 26, 2009

Related U.S. Application Data

(60) Provisional application No. 60/974,682, filed on Sep. 24, 2007.

(51) Int. Cl.
*F16L 55/10* (2006.01)

(52) U.S. Cl. ........... 138/89.1; 138/89; 138/90; 73/866.5

(58) Field of Classification Search .......... 138/89, 138/89.1, 90; 73/756, 866.5; 251/264, 325; 137/557
See application file for complete search history.

(56) References Cited

U.S. PATENT DOCUMENTS

| | | | |
|---|---|---|---|
| 3,797,317 A * | 3/1974 | Peterson, Jr. ................... | 73/756 |
| 4,252,627 A | 2/1981 | Ohashi et al. ................. | 204/415 |
| 4,926,704 A | 5/1990 | Survil et al. ................. | 73/866.5 |
| 5,062,310 A * | 11/1991 | Eaton ........................... | 73/866.5 |
| 5,079,962 A * | 1/1992 | Peterson, Jr. ................. | 73/866.5 |
| 5,407,333 A | 4/1995 | Lambright ..................... | 417/514 |
| 5,708,210 A * | 1/1998 | Gardellin ....................... | 73/730 |
| 6,523,568 B1 | 2/2003 | Trantham ................. | 137/599.16 |
| 6,655,651 B2 | 12/2003 | Tokuda et al. ............... | 251/63.6 |
| 6,899,317 B2 * | 5/2005 | Brady et al. ................... | 251/264 |

* cited by examiner

*Primary Examiner* — Patrick F Brinson
(74) *Attorney, Agent, or Firm* — Law office of Ken Dallara; Ken Dallara

(57) ABSTRACT

A venting probe insertion chamber that is attached to a uniquely designed port which combines the attributes of a probe insertion chamber along with the ability to vent to atmosphere gasses that are present in piping system. This invention combines the functions of two existing products in an economically viable product. This inventive design performs all task required without the need for O-rings or sealing elements present on prior art products. Creating a simpler to manufacture and maintain device that allow for a user to obtain accurate readings of temperature and pressure while using a minimal amount of tooling. The user is able to remove the protective cap while using only a single tool to prevent dislodgement of the product from the associated port. Current state of the art can potentially place a user in harm as accidental dislodgement of their product can occur having only a single operator.

11 Claims, 3 Drawing Sheets

COMBINED PRESSURE, TEMPERATURE AND AIR VENT DEVICE

PRIOR APPLICATIONS

This application incorporates provisional application No. 60/974,682 entitled "Combined Pressure, Temperature and Air Vent Device" filed Sep. 24, 2007 and is co-pending, said incorporation claims all benefits thereof, and is herein incorporated herein by reference in it's entirety.

FIELD OF THE INVENTION

This invention has a preferred use in piping structures such as those found in heating, ventilation and air conditioning systems, or other applications where the control and routing of fluids are necessary and especially where measurement of said fluids are to be taken and it is desirable to remove trapped gasses from said fluids.

BACKGROUND OF THE INVENTION

In a piping system, there is a need to place monitors into the fluid stream which sense the pressure or temperature of the fluid stream along with any other measurements that need to be taken. Currently available devices, such as described in U.S. Pat. No. 4,926,704 issued to Survil et al on May 22, 1990, are used to the placement of probes or other devices into a fluid stream. These devices are threadably connected onto a valve housing or other weldment and a probe is inserted through a elastomeric core which provides a seal during usage.

There exists a need to have gasses removed from the piping structure, either prior to filling the system with fluids or during usage as gasses may have been allowed to enter the closed system. The piping systems also need to be able to be drained after usage or for maintenance issues, hereby introducing the need to have gasses to be able enter the system to prevent a vacuum effect from being caused as the fluid is evacuated from the system. In the present state of the art, air vent devices are introduced to allow for gasses to enter into or to be exhausted therefrom the system. Each addition device needs to be able to interface with accessory ports located on the valve housing or weldments in the piping system. Each device needs a port and must be planned in advance of the system needs so that the ports are included on the valves. These extra ports increase cost to the valve housing and create opportunities for the introduction of contamination into the systems or present opportunities for leakages.

There exists a need to have the ability to combine as many functions into a single device to reduce the cost of manufacturing valve housings and other weldments. There exists a need to have a single device to be capable of receiving probes and the like, and also function as an air vent. There is also a need to have this device be manufactured in such a manner so as to reduce the number of parts required along with decreasing machining tolerances so as to reduce cost. There also exists a need not to have this device contain or rely on O-rings as a form of sealing the device from the escaping fluid flow. O-Rings required added maintenance as they will wear out and O-rings are very susceptible to failure due to chemical attack. Lubrication applied to these O-rings also introduce contaminates into the fluid flow.

There are currently available state of the art devices that combine a probe insertion through-hole along with an air vent. U.S. Pat. No. 6,899,317 issued to Brady et al on May 31, 2005, hereinafter referred to as '317, and U.S. Pat. No. 6,523, 568 issued to Trantham on Feb. 25, 2003, hereinafter referred to as '568, are representative of the prior art available on the market today. Each one has a two piece design wherein the first body comprises the part of the device attached to a threaded port on the valve and a second body is threadably attached and located inside of the first body which contains a sealing core and the mechanism to allow for the ingress or egress of gasses. Both devices require the user to remove the second body from the first body. When an operator is instructed to obtain a pressure or temperature reading from a piping system, it is important that the operator remove any trapped gasses present in the system to insure a proper read. The operator will unscrew the cap at the top of the device, and will then have to unscrew the second body from the first body to relieve the system of built-up gasses. One difference between '317 and '568 is the route the release gasses take to atmosphere; '317 exits perpendicular to the valve body while '568 exits collinearly with the valve body.

Currently available prior art presents the following issues that are overcome with the disclosed invention. The first issue regards the number of threaded portions that need to be loosened to allow for the flow of gasses. First the user needs to unscrew the top cap. Should the cap require a wrench to unscrew the cap, the user is also required to place a counter rotating wrench on either the first body or the second body to prevent dislodgement of the first body from the threaded port or the second body from the first body. Unfortunately, the user either has to choose which body to counter-rotate or a second person needs to be present. Since the greatest majority of these devices are in locations where a single person has problems accessing these devices, a second person required will be very difficult. A single user can dislodge the non-held body which could lead to a blowout or potential injury from potential lethal escaping gasses. One object of this invention is to allow for only a single user to safely perform the uncapping and air release functions. Secondly, due to the design limitation, O-rings are required. '317 contains a sealing ring directly in fluid flow called the "operative element of the seal being an elastomeric ring" at column 3 line 15-16. '568 states that the "O-ring functions to prevent fluid media from seeping in between the inner sleeve and outer body and to direct fluid media to the appropriate flow passages" at column 4 lines 28-31. O-rings that come in contact with the fluid media will wear out under stress and repeated usage. O-rings also can introduce contamination into the fluid flow through their lubrication and composition. It is a further object of this invention to create a device that will eliminate the need for O-rings which will decrease or eliminate the need for maintenance or wear items. Thirdly, due to the complexity of the parts used in '317 and '568 along with the tolerancing needed to maintain the proper dimensions, the current state of art is an expensive device with many stages where a single manufacturing error will scrap the entire part. It is a further object of this invention to create a device whereby tolerancing is kept at acceptable manufacturing standards and where mechanical advantages through the use of straight threads is used to create a device which is more economically feasible. Fourthly, current state of art devices need to be safely designed to accommodate the safety and usability by the user. The released gasses in '568 are routed directly at the user through the top of the device. Patent '317 has a gas exit located along the outer first body but due to installation variables, such as how far it is tightened, the exit might be pointing directly at the user or away from him. It is a further object of this invention to create a device that will safely escape those gasses away from the user in the same direction regardless of orientation of the device.

By the above-described description of the objects of this invention to provide the functions required of this invention to allow for escapement of gasses in a piping system, it is understood that those who are skilled in the art could adapt or modify those elements presented in this disclosure in applications other than that described in the best mode of operating this invention. It is tacitly understood in the scope and spirit of this disclosure that those other devices would be incorporated into this invention.

DETAILED DESCRIPTION OF THE DRAWINGS

Figure 1:
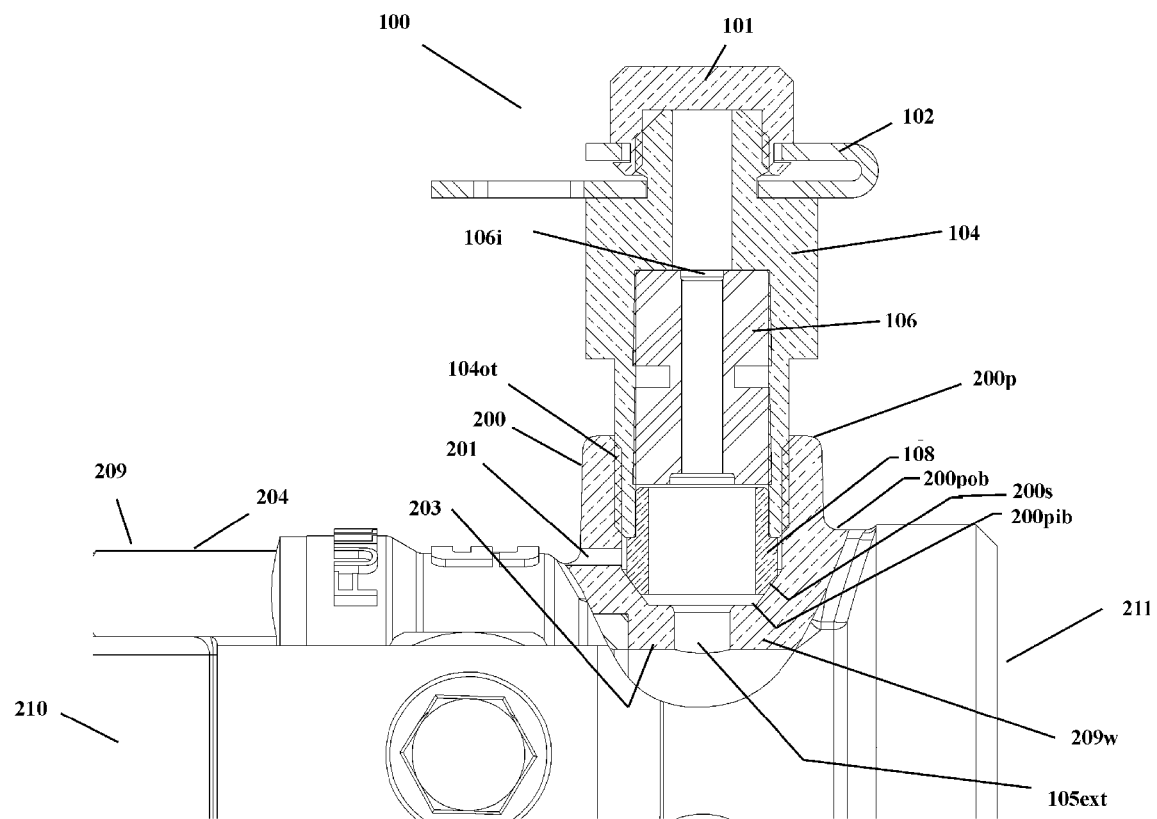
In FIG. 1, the invention device is shown installed onto an accessory port of a valve housing, in this case a ball valve housing.

Combined temperature, pressure and air vent device 100 is constructed of material that is strong enough to withstand the abusive conditions into which it will be introduced but ductile enough to be machined. In the current invention, brass, bronze or stainless steel is used. This does not preclude the use of plastics or composites. Cap 101 is captured by retaining strap 102 and is constructed of similar material as device 100. The mating surface 103 is used to secure the cap in place in case of leakage. In this device, threads are used to maintain sufficient contact between the inner surface of cap 101 and ingress flat opening 104$i$ of body 104. Body 104 is defined by an outer bore 104$ob$ which is substantially cylindrical in nature, having an altered surface to designed to accept a mechanical leverage means, such as having a hex shaped area to accept a wrench or a knurled section to accept a gripping device, such as pliers. Body 104 has a hollow bore defined into two sections; 104$sb$ is a smaller inner bore emanating from the ingress opening 104$i$ and larger inner bore 104$lb$ which shares a common central vertical axis with small bore 104$sb$ and continues from inner step 104$is$ to egress opening 104$e$. Larger bore 104$lb$ is created to be slightly longer than the combined length of core 106 and seal insert engagement length 108$el$. Absolute concentricity of inner bores 104$sb$ and 104$lb$ to outer bore 104$ob$ is desired but not essential, being able to adapt to certain conditions.

At the end opposite of ingress 104$i$, along a similar vertical axis, is egress 104$e$. Immediately appurtenant to egress 104$e$ are threads 104$ot$. In this invention, threads 104$ot$ are American Standard Straight Threads. The purpose of American Standard Thread is to reduce the amount of torque required for sealing, as National Standard Pipe (NPT) thread which is tapered requires more torque, introducing the occurrence of the possibility of damage to the threads or the boss that contains the threads. The use of straight threads replaces the need for thread sealing means required for use with NPT threads. Teflon tape can drastically increase thread diameter causing stresses on the boss or pipe dope is used, which can lead to contamination if too much is used. It is critical that the threads are designed such that they will not cause the device 100 to stop until there is a positive placement of seal insert slope 108$s$ upon the mating section 200$s$ of the accessory port or 300$s$ of the weldment port.

Figure 2:
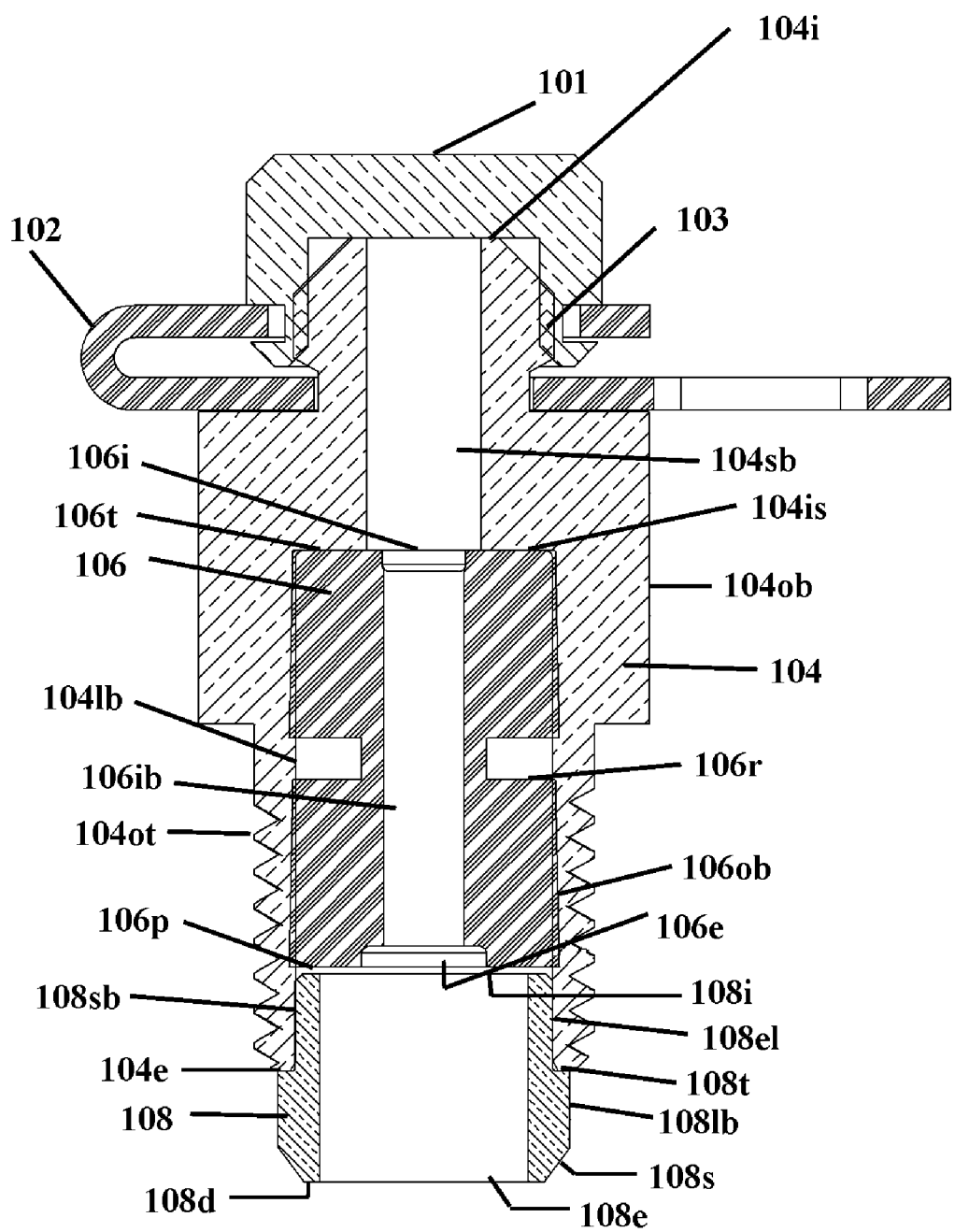
In FIG. 2, a cross-sectional view of the invention device is shown.

Core 106 is a hollow elastomeric piece having a consistent shore hardness and which is dumbbell shaped having a top portion 106$t$ containg an ingress point 106$i$, a lower portion 106$p$ containing egress point 106$e$ and a relief area 106$r$. Top portion 106$t$ is in proximate contact with inner step 104$is$. Ingress 106$i$ is located along the same vertical axis as inner bore 104$sb$ and contains a slit-like openings which yields with the insertion of a probe but returns to a relaxed state of near complete closure. Egress point 106$e$ is similarly shaped as ingress 106$i$ but has a slightly larger opening to prevent excess adhesion of the probe while it is being retracted. Relief area 106$r$ reduces the rigidity of core 106 allowing for it to adapt more easily to changing pressures, probe sizes and aids in the insertion of the core 106 into larger bore 104$lb$. Core 106 has a continuous inner bore 106$ib$ which is in communication with ingress 106$i$, which is located along the axis of ingress 104$i$ along top of core 106$t$ and egress 106$e$, which is located along the same axis as ingress 104$i$ and ingress 106$i$ along lower portion of core 106$p$. Outer bore 106$ob$ is of such diameter as to be slightly greater in diameter than is the diameter of larger bore 104$lb$. This will create an interference fit which is shown in FIG. 2 as the overlapping of crosshatching between core 106 and body large inner bore 106$lb$. This interference is such as to prevent the dislodgement of the core 106 during assembly and to provide a seal preventing leakage.

Core 106 is also held in place by seal insert 108 which is constructed of a ductile material, which has a hardness value greater than or equal to the hardness value of the material used in body 104 and which is chemically inert to those chemicals found in the piping systems where this device will be used. Material should be harder or equal to the hardness of the material used to construct the accessory port 200 on valve body 209 in FIG. 1 or accessory port 300 on weldment 309. This hardness inter-relationship critical to facilitate the AN style of metal to metal seal that is accomplished and is critical to the success of this invention. Seal Insert 108 has an inner bore 108$i$ and a two step outer bore where outer small bore 108$sb$ provides an interference fit with large bore 104$lb$ and outer bore 108$lb$ contains mating slope 108$s$ at the distal end of insert 108$d$. Top section 108$t$ is located in proximate distance from lower portion of core 106$p$, allowing for the flexing due to temperature conditions and insertion of the probe through the inner bore 106$ib$. Top of outer step 108$t$ is in complete contact with egress 104$e$.

Valve body 209 as shown in FIG. 1 is specially modified to adapt to this new inventive device. A typical prior art valve body has a leading portion 210 and a trailing accessory portion 211. The accessory portion contains accessory ports 200$p$ that are located circumferentially about the outer bore 204 of valve body 209. This unique accessory port has located at the junction between the port 200$p$ and outer bore 204 is an air relief passage 201. The size of passage 201 is calculated to allow for the maximum amount of air flow that will be allowed to pass between the area containing accessory port slope 200$s$ and slope 108$s$. The cross-sectional parameters of passage 201 are not critical so long as the volume of air necessary is allowed to pass without interference. In this invention a circularly shaped passage is created. Valve body wall 209$w$ is defined as the difference between outer bore 204 and inner bore 203 of valve body 209. Wall 209$w$ varies in thickness depending upon location along the valve body. Accessory port 200$p$ is defined by an outer wall 200$pob$ protruding outwardly from valve outer bore 204 and an inner bore 200*pib*. Inner bore 200*pib* contains mating threads that coincide with threads 104*ot*. It is important that slope 200*s* which is at the distal end of inner bore 200*pib* is located below passage 201. Probe egress 105*ext* is located at a point where it's central axis is concentric with core egress 106*e*, and is located at the point beneath slope 200*s* and provide a through-hole past inner bore 203. It is critical that slope 108*s* and 200*s* are completely concentric as this is the sealing area for the device.

Figure 3:
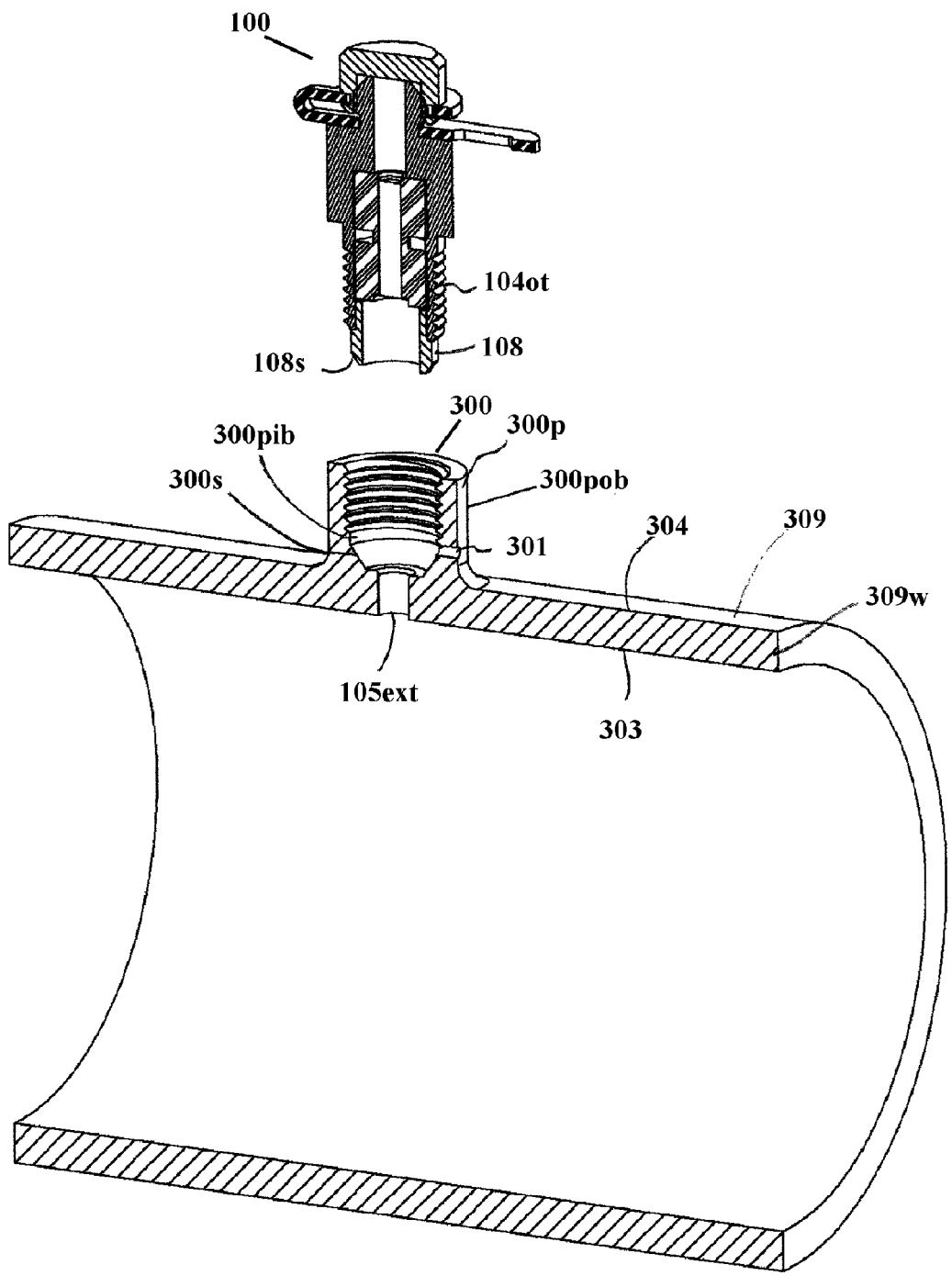
In FIG. 3, a cross sectional view of a weldment that can be spliced inline in current piping systems is shown with the invention device yet to be assembled. This figure shows the wide variety of applications where the device can used with existing or new weldments including couplers, saddle joints or fittings with accessory ports.

Another embodiment of this device can be seen in FIG. 3 as this device can be used with a standalone weldment which can be used anywhere in the piping system. FIG. 3 shows a cross sectional view of a weldment that is used inline with the piping system, but further embodiment using saddle joints or other common plumbing fittings are possible and are considered to be within the spirit and scope of this application. The term weldment simply refers to an additional entity that is added onto an existing pipe in a piping structure. It does not refer solely to the means of attachments. The device can be attached to ferrous or stainless steel pipes through welding or brazing, onto plastic pipes through gluing.

FIG. 3 details a weldment 309 with an accessory style port 300*p* are similar to the valve body 209 and accessory port 200*p*. Accessory port 300*p* is located along the circumferential outer wall 304 which pierces through weldment wall 309*w* into contact with weldment inner bore 303. Passage 301 creates a passageway between accessory port outer wall 300*pob* into the inner bore of weldment accessory port 300*pib*. Inner bore 300*pib* contains mating threads that coincide with threads 104*ot*. It is important that slope 30*s* which is at the distal end of inner bore 300*pib* is located below passage 31. Probe egress 105*ext* is located at a point where it's central axis is concentric with core egress 106*e*, and is located at the point beneath slope 300*s* and provide a through-hole past inner bore 303. It is critical that slope 108*s* and 300*s* are completely concentric as this is the sealing area for the device.

It is obvious that one skilled in the art can combine this device with applications other than piping systems and into applications where a probe is not required to be placed therethrough. It is within the spirit and scope of this application to include such applications of using a passageway through the apparatus where a device is threadably attached thereto, to allow for the ingress and egress of gasses.

What is claimed is:

1. An apparatus that combines the capabilities of having a sealed access port designed to allow insertion of measurement devices and having the ability to allow for ingress and egress of trapped gasses to atmosphere comprising:
   a cylindrical body having a stepped outer bore and a stepped inner bore, said body having a proximal end containing threads and a distal end containing an atmospheric opening and an externally distal threaded portion,
   an elastomeric core,
   a threaded cap with retaining means to secure it to said distal end of said body, said threaded cap threadably related to said externally distal threaded portion of said body,
   an insert adapted to interface through a press fit with said inner stepped bore, said insert possessing a ingress end and an egress end, said egress end having an angular sealing surface and,
   a threaded accessory port, having a vertical axis, internal threads, having at least one exhaust passageway at an angle not coincident with said vertical axis, where said accessory port has an egress end and an ingress end for accepting said cylindrical body, and said port has an interior portion containing threads mating with said mating threads of said cylindrical body and an internal angular mating surface, said internal angular surface terminating at an angle coincident to said angular sealing surface of said insert creating an AN style of fitting, and an exterior surface, through which said exhaust passageway originates, said passageway terminating at said interior portion.

2. An apparatus that combines the capabilities of having a sealed access port designed to allow insertion of measurement devices and having the ability to allow for ingress and egress of trapped gasses to atmosphere as in claim 1 where said internal angular surface of said accessory port terminates at an angle coincident to said angular sealing surface of said insert creating a conical seal.

3. An apparatus that combines the capabilities of having a sealed access port designed to allow insertion of measurement devices and having the ability to allow for ingress and egress of trapped gasses to atmosphere as in claim 1 where said elastomeric core has a barbell shaped exterior surface and an interior bore section, said core having a probe entrance section on the top end of said barbell shaped core and a probe exit section at the bottom end of said barbell shaped core, and a relief section located between said entrance and exit section, said core having an inner probe pathway along the vertical axis of said core, said pathway having an entrance diameter, an exit diameter and a middle diameter.

4. An apparatus that combines the capabilities of having a sealed access port designed to allow insertion of measurement devices and having the ability to allow for ingress and egress of trapped gasses to atmosphere as in claim 3 where said exterior surface of said elastomeric core maintains interference fit with said lower bore section of said stepped interior bore.

5. An apparatus that combines the capabilities of having a sealed access port designed to allow insertion of measurement devices and having the ability to allow for ingress and egress of trapped gasses to atmosphere as in claim 1 where said insert is constructed of a material of greater or equal hardness to that of said threaded port.

6. An apparatus that combines the capabilities of having a sealed access port designed to allow insertion of measurement devices and having the ability to allow for ingress and egress of trapped gasses to atmosphere as in claim 1 where said egress end of said threaded port is adhered onto existing piping structure, where said adhering means is selected from the grouping containing, welding, gluing, or brazing.

7. An apparatus that combines the capabilities of having a sealed access port designed to allow insertion of measurement devices and having the ability to allow for ingress and egress of trapped gasses to atmosphere as in claim 1 where said egress end of said threaded port is cast thereupon a valve body.

8. An apparatus that combines the capabilities of having a sealed access port designed to allow insertion of measurement devices and having the ability to allow for ingress and egress of trapped gasses to atmosphere as in claim 1, where said mating threads of said threaded accessory port and said mating threads on said proximal end of said body are straight pipe thread.

9. An apparatus that combines the capabilities of having a sealed access port designed to allow insertion of measurement devices and having the ability to allow for ingress and egress of trapped gasses to atmosphere as in claim 3, where said relief section has an outside diameter which is less than the outside diameter of said top end of said core.

10. An apparatus that combines the capabilities of having a sealed access port designed to allow insertion of measurement devices and having the ability to allow for ingress and egress of trapped gasses to atmosphere as in claim 3 where said exit diameter of said inner pathway has a larger diameter than said entrance diameter.

11. An apparatus that combines the capabilities of having a sealed access port designed to allow insertion of measurement devices and having the ability to allow for ingress and egress of trapped gasses to atmosphere as in claim 1 where said egress end of said accessory port contains the port probe exit, diameter of said port probe exit having a diameter less than said exit diameter of said core and said port probe exit diameter is larger than said entrance diameter of said core.

* * * * *